United States Patent [19]

Akesson et al.

[11] Patent Number: 4,780,328
[45] Date of Patent: Oct. 25, 1988

[54] PROCESS FOR PREPARING FROZEN ROLLED COD TAIL

[75] Inventors: Yngve R. Akesson, Halsingborg; Else M. Andersen, Bjuv; Mats Olofsson, Astorp, all of Sweden

[73] Assignee: Nestec S.A., Vevey, Switzerland

[21] Appl. No.: 906,831

[22] Filed: Sep. 12, 1986

[30] Foreign Application Priority Data

Sep. 14, 1985 [EP] European Pat. Off. ......... 85111663.2

[51] Int. Cl.$^4$ .......................... A23L 1/325; A23P 1/10
[52] U.S. Cl. .................................... 426/390; 426/284; 426/389; 426/513; 426/514; 426/524; 426/643
[58] Field of Search ................ 426/92, 280, 284, 297, 426/643, 513, 514, 389, 390, 524; 264/28

[56] References Cited

U.S. PATENT DOCUMENTS

| 1,679,660 | 8/1928 | Haskell | 426/391 |
| 1,975,031 | 9/1934 | Wilkes et al. | 426/391 X |
| 2,674,960 | 4/1954 | De Pasquale | 426/280 |
| 3,180,737 | 4/1965 | Culp | 426/513 X |
| 3,370,960 | 2/1968 | Jaccard | 426/513 X |

FOREIGN PATENT DOCUMENTS 1454172 4/1969 Fed. Rep. of Germany .

Primary Examiner—Steven Weinstein
Assistant Examiner—Celine T. Callahan
Attorney, Agent, or Firm—Vogt & O'Donnell

[57] ABSTRACT

A process of preparing a frozen rolled cod tail wherein a cod tail is rolled around a spindle, then frozen partially or completely, afterwards removed from the spindle and, if necessary, frozen completely. The frozen rolled cod tails may be filled later when desired.

10 Claims, 1 Drawing Sheet

PROCESS FOR PREPARING FROZEN ROLLED COD TAIL

BACKGROUND OF THE INVENTION

The present invention relates to the production of a frozen fish product more particularly to a process for preparing a frozen rolled cod tail which is to contain a filling.

The production of frozen rolled cod tails containing a filling usually involves bringing already frozen cod tails to the factory, defrosting them, placing the filling on top, folding the cod tails over the enclose the filling, and then deep freezing. However, during freezing of fish, desirable aromas are lost and during defrosting water drips are lost. Therefore, two complete freezing steps, as are necessary in the usual production method described above, lead to a fish product which has lost even more of its desirable aroma. Moreover, the water drips which are lost during defrosting lead to a drier product with an inferior texture for the consumer.

SUMMARY OF THE INVENTION

We have now developed a process for preparing a frozen rolled cod tail in which only one complete freezing step is necessary, and with the added advantage that the filling may be added when and as desired, after freezing.

Accordingly, the present invention provides a process of preparing a frozen rolled cod tail characterised in that a cod tail is rolled around a spindle, then frozen partially or completely, afterwards removed from the spindle and, if necessary, frozen completely.

DESCRIPTION OF THE PREFERRED EMBODIMENTS

The cod tail that is used in this proces is conveniently fresh cod that has not been frozen.

The spindle may be solid or hollow and may be made of any suitable material of sufficient firmness. For example, it may be made of a metal such as stainless steel, but it is preferably made of a plastics material such as Teflon or a polyvinyl resin, preferably polyvinyl chloride. The shape of the spindle may vary according to the requirements and it may have, for instance, a circular, square or rectangular cross-section.

The cod tail is conveniently rolled round the spindle by hand.

When rolled around a solid spindle, the cod tail is initially frozen on the outer surface, then removed from the spindle and finally frozen completely. Conveniently, the cod tail is frozen on the outer surface in a liquid gas freezer using, for example, liquid carbon dioxide or liquid nitrogen. It is important that, during this freezing step, the cod tail is not completely forzen, otherwise its internal surface around the spindle would stick to the spindle. Preferably, the freezing on the solid spindle is carried out only for a sufficient length of time to form a rolled cod tail of sufficient rigidity to enable it to be removed from the spindle and transferred to the final freezing zone without losing its shape. The time of freezing is usually from 2 to 7 minutes and preferably from 3 to 6 minutes during which only the outer surface or crust is frozen.

After this time the spindle can be removed quite easily, conveniently by hand.

The rigid rolled cod tail with only its surface frozen is then deep frozen, for example, in a plate freezer or a tunnel freezer at $-30°$ C.

When rolled around a hollow spindle, the cod tail is initially frozen completely, after which a liquid above the freezing point is conveyed through the inside of the hollow spindle until the temperature of the spindle has increased sufficiently to enable it to be separated from the frozen rolled cod tail.

The cod tail may be frozen on the hollow spindle on a standard freezing belt, for example, in a plate freezer or a tunnel freezer at $-30°$ C.

The hollow spindle has means to enable liquid to be conveyed through the inside, for instance, by spraying, and the liquid is conveniently water. The temperature of the liquid may be up to $40°$ C., and preferably from $5°$ C. to $30°$ C. The time during which the liquid is conveyed through the hollow spindle in order to raise the temperature sufficiently to enable it to be separated from the frozen rolled cod tail may vary widely, for instance, from 3 seconds to 5 minutes. However, from an economic point of view, times longer than 2 minutes are not usually practical. It is especially advantageous that the liquid is at a temperature of from $15°$ C. to $25°$ C. and passes through the hollow spindle for a period of from 10 to 60 seconds.

One big advantage of the use of a hollow spindle where the cod tail is completely frozen is that it is possible to freeze in a plate freezer between two plates that form a mould of any desired shape and size, for example, the same shape and size as the container into which the final product is to be enclosed.

A further advantage of the process of this invention is that the filling and, if desired, a topping sauce may be added when desired and can be chosen according to taste. For example, a suitable filling would be whole spinach leaves and examples of topping sauces are sauces of shell fish, vegatables or spices, etc.

The present invention will now be further illustrated by way of example with reference to the accompanying drawings.

DESCRIPTION OF THE DRAWINGS

Figure 3:
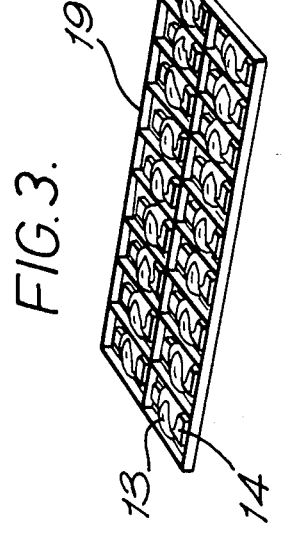
FIG. 3 is a plan view of a freezing frame containing cod tails folded around spindles and FIG. 4 is a diagrammatic side section of the rolled cod tails being transported through a gas freezer.
Figure 2:
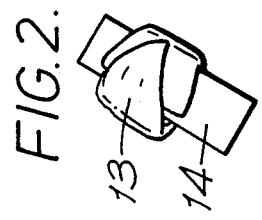
FIG. 2 is a plan view of a cod tail folded around a spindle.
Figure 1:
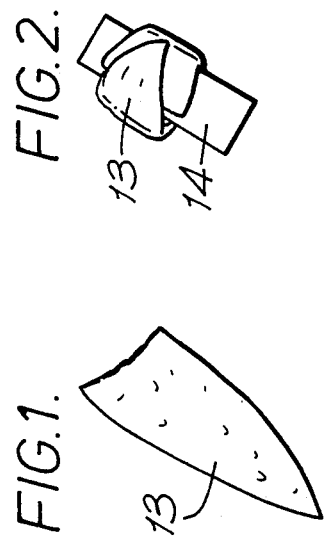
FIG. 1 is a plan view of a cod tail.
Figure 4:
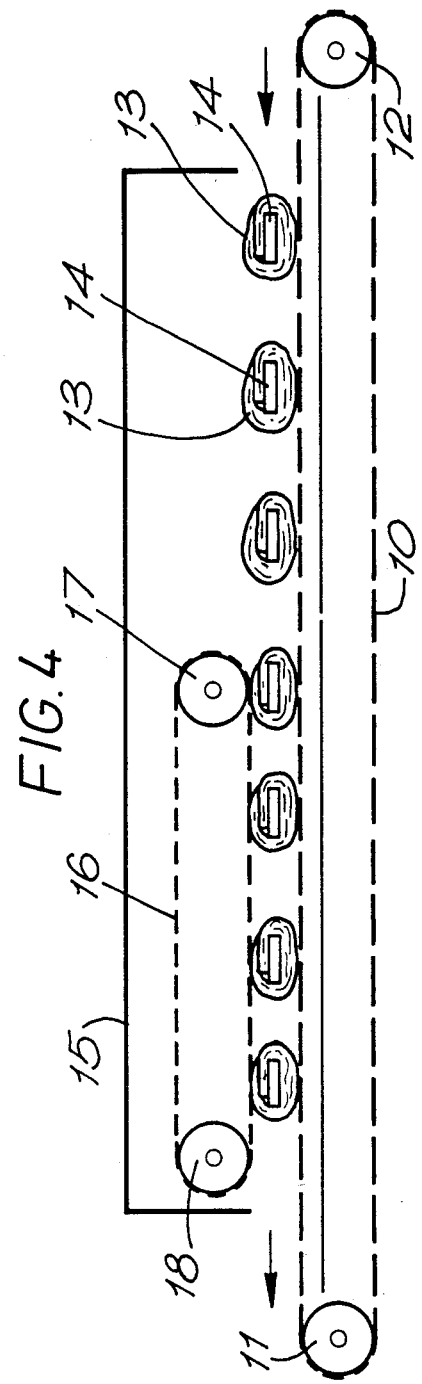

Referring to the drawings, a conveyor belt 10 trained about rollers 11, 12 transports cod tails 13 which have been folded around solid polyvinyl chloride spindles 14 through a carbon dioxide gas freezer 15. A press belt 16, trained about rollers 17, 18, positioned above the rolled cod tails 13 with its lower run travelling in the same direction as the upper run of the conveyor belt 10, presses the rolled cod tails so that their thickness on emerging from the freezer is 33 mm. The time of transport of each rolled cod tail through the gas freezer is 4.5 minutes. After leaving the gas freezer, the spindle is removed from the rolled cod tails which are then transported to a tunnel freezer where they are deep-frozen at $-30°$ C.

In another embodiment of the present invention cod tails 13 are folded around hollow polyvinyl chloride spindles 14 and transported in a freezing frame 19 for 45 mins. at −30° C. in a plate freezer. During this time the cod tails are pressed between two plates to adjust the thickness of the frozen cod tail rolls. Afterwards the cod tails folded around the spindles are transported to a defroster where water at 20° C. is sprayed through the inside of the hollow spindles for 30 seconds to enable the cod tail rolls to be separated from the spindles.

We claim:

1. A process for preparing frozen rolled cod tail comprising rolling unfrozen cod tail around a spindle, for having an internal surface of the cod tail around the spindle and having an outer surface away from the spindle, partially freezing the cod tail while on the spindle for a time sufficient for freezing at least the outer surface away from the spindle for imparting rigidity to the cod tail and without the internal surface of the cod tail around the spindle freezing and sticking to the spindle, removing the partially frozen cod tail from the spindle and then completely freezing the cod tail.

2. A process according to claim 1 wherein the cod tail is partially frozen in a liquid gas freezer.

3. A process according to claim 2 wherein a liquid gas for freezing is selected from the group consisting of liquid carbon dioxide and liquid nitrogen.

4. A process according to claim 2 wherein the time of partial freezing in the liquid gas freezer is from 2 to 7 minutes.

5. A process for preparing frozen rolled cod tail comprising rolling unfrozen cod tail around a hollow spindle, freezing the cod tail while on the spindle, conveying a liquid through the spindle for increasing the temperature of the spindle sufficiently for separating the frozen cod tail from the spindle and separating the cod tail from the spindle.

6. A process according to claim 5 wherein the liquid conveyed through the spindle is water.

7. A process according to claim 5 wherein the liquid conveyed through the spindle is at a temperature of from 5° C. to 40° C.

8. A process according to claim 7 wherein the liquid is conveyed through the spindle for from 3 seconds to 5 minutes.

9. A process according to claim 7 wherein the liquid is conveyed through the spindle at a temperature of from 15° C. to 25° C. for from 30 seconds to 60 seconds.

10. A process according to claim 5 wherein the cod tail is frozen in a freezer selected from the group consisting of a freezing belt freezer and a plate freezer.

* * * * *

UNITED STATES PATENT AND TRADEMARK OFFICE
CERTIFICATE OF CORRECTION

PATENT NO. : 4,780,328

DATED : October 25, 1988

INVENTOR(S) : Yngve AKESSON, et al.

It is certified that error appears in the above-identified patent and that said Letters Patent is hereby corrected as shown below:

Column 1, line 14, the second occurrence of "the" should be --to--.

Column 1, line 57, "forzen" should be --frozen--.

Column 3, line 1, "19" should appear in bolded type.

Signed and Sealed this

Fourteenth Day of March, 1989

Attest:

DONALD J. QUIGG

*Attesting Officer*  *Commissioner of Patents and Trademarks*